US009255377B2

(12) United States Patent
Colwell et al.

(10) Patent No.: US 9,255,377 B2
(45) Date of Patent: Feb. 9, 2016

(54) CONTROLLING THE OPERATION OF AN INDUSTRIAL MACHINE BASED ON WIRE ROPE DEAD WRAPS

(71) Applicant: Harnischfeger Technologies, Inc., Wilmington, DE (US)

(72) Inventors: Joseph J. Colwell, Hubertus, WI (US); Michael Linstroth, Port Washington, WI (US); Nicholas R. Voelz, Jackson, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 0 days.

(21) Appl. No.: 14/601,699

(22) Filed: Jan. 21, 2015

(65) Prior Publication Data

US 2015/0204048 A1 Jul. 23, 2015

Related U.S. Application Data

(60) Provisional application No. 61/929,763, filed on Jan. 21, 2014.

(51) Int. Cl.

| | |
|---|---|
| ***G06F 7/70*** | (2006.01) |
| ***E02F 3/30*** | (2006.01) |
| ***B66D 1/40*** | (2006.01) |
| ***E02F 3/46*** | (2006.01) |
| ***E02F 9/20*** | (2006.01) |

(52) U.S. Cl.

CPC . *E02F 3/304* (2013.01); *B66D 1/40* (2013.01); *E02F 3/46* (2013.01); *E02F 9/2016* (2013.01)

(58) Field of Classification Search

USPC ........................................................... 701/50

See application file for complete search history.

(56) References Cited

U.S. PATENT DOCUMENTS

| | | | | |
|---|---|---|---|---|
| 8,032,213 | B1 * | 10/2011 | Qu | A61N 1/3943 607/28 |
| 8,209,096 | B2 * | 6/2012 | Claxton | E02F 3/30 172/2 |
| 2003/0001147 | A1 * | 1/2003 | Kiviniitty | B66D 3/22 254/342 |
| 2011/0272377 | A1 * | 11/2011 | Willim | B66C 23/185 212/285 |
| 2013/0110460 | A1 * | 5/2013 | Taylor | E02F 3/46 702/158 |
| 2015/0240562 | A1 * | 8/2015 | Ferrari | E21B 15/00 52/118 |

OTHER PUBLICATIONS

Joy Global, Wire Rope, ESGN-C-M-WR-EN-0000, Sep. 2013, 32 pages.

* cited by examiner

*Primary Examiner* — Hussein A. Elchanti

(74) *Attorney, Agent, or Firm* — Michael Best & Friedrich LLP

(57) ABSTRACT

An industrial machine that includes a dipper, a hoist drum, a wire rope connected between the hoist drum and the dipper, a hoist motor, a sensor, and a controller. The sensor generates a signal related to a number of wire wraps of the wire rope around the hoist drum, which is received by the controller. The controller determines, based on the signal from the sensor, the number of wire wraps around the hoist drum. If the controller determines that there are an insufficient number of dead wraps around the hoist drum, the controller sets one or more parameters of the hoist motor. The controller sets each of the one or more parameters of the hoist motor to a value that is lower than a normal operational value for the parameter.

24 Claims, 9 Drawing Sheets

CONTROLLING THE OPERATION OF AN INDUSTRIAL MACHINE BASED ON WIRE ROPE DEAD WRAPS

RELATED APPLICATIONS

This application claims the benefit of U.S. Patent Application No. 61/929,763, filed Jan. 21, 2014, the entire content of which is hereby incorporated by reference.

BACKGROUND

This invention relates to controlling the operation of an industrial machine, such as an electric rope or power shovel.

SUMMARY

Industrial machines, such as electric rope shovels are used to execute digging operations to remove material from, for example, a bank of a mine. There are, however, a number of different industrial machines available in the market today. Because of differences in size, geometry, performance capabilities, etc., a user may have to have a number of different machines available to complete different tasks.

Among those machines may be a number of rope shovels. Rope shovels typically include a wire rope and a hoist drum around which the wire rope is wrapped. The end of the wire rope are fitted with a becket that rigidly attaches the wire rope to the hoist drum, and the becket is crimped onto an end of the wire rope to secure the becket to the wire rope. The becket is not, however, designed to or capable of holding the entire weight of the payload (e.g., the dipper, the material within the dipper, and any other components of the machine whose weight is supported at least in part by the wire rope, etc.). Rather, the weight of a payload is taken up by dead wraps around the hoist drum (i.e., persistent revolutions of the wire rope around the hoist drum). As a load is applied to the shovel, the dead wraps tighten around the drum. The friction between the drum and the wire rope anchors the wire rope to the drum while the shovel is in operation to support the payload.

Embodiments of the invention described herein relate to an industrial machine and a control system for an industrial machine that regulates or controls, for example, motor torques and speeds applied to a wire rope such that the torques and speeds are related (e.g., proportional) to a number of dead wraps of the wire rope around the hoist drum. The control system allows for a common rope length to be used between different machines. By determining the total number of wire wraps around the hoist drum (i.e., including dead wraps and active wraps), the control system is able to ensure that a sufficient number of dead wraps are present for a given load, and motor torques and speeds are limited until there are a sufficient number of dead wraps for the load. As a result, the control system only applies peak loads to the wire rope when a sufficient or minimum number of dead wraps are present on the hoist drum.

Additionally, by ensuring that there are always a sufficient number of wire rope dead wraps on the hoist drum, a shorter hoist wire rope than would otherwise be required can be used because full power is only applied when there are a sufficient number of dead wraps to support the load on the wire rope. This, for example, allows a wire rope that may be sufficiently long for an older machine to be used on a newer, larger machine without concern that the safety of the new machine may be compromised by applying a load that the wire rope and becket cannot support.

In one embodiment, the invention provides an industrial machine that includes a dipper, a hoist drum, a wire rope connected between the hoist drum and the dipper, a hoist motor, a sensor, and a controller. The sensor generates a signal related to a length of the wire rope or a location of the dipper, which is received by the controller. The controller determines, based on signal from the sensor, one of a total number of wire wraps around the hoist drum, a length of the wire rope, or a location of the dipper. If the controller determines that there are an insufficient number of dead wraps around the hoist drum, or that the location of the dipper or the length of the wire rope corresponds to an insufficient number of dead wraps around the hoist drum, the controller sets one or more parameters of the hoist motor. The controller sets each of the one or more parameters of the hoist motor to a value that is lower than a normal operational value for the parameter. When the controller determines that there are a sufficient number of dead wraps around the hoist drum to apply normal operational power to the wire rope, the controller resets the one or more parameters to normal operational values.

In another embodiment, the invention provides an industrial machine that includes a hoist drum, a dipper, a wire rope connected between the hoist drum and the dipper, a motor, a sensor, and a controller. The motor is configured to apply a force to the wire rope and has at least one operating parameter. The sensor generates a signal related to a length of the wire rope, which is received by the controller. The controller determines, based on the signal from the sensor, a total number of wire wraps around the hoist drum, and compares the total number of wire wraps to a threshold. The controller sets the at least one operating parameter of the motor to a first operational value if the total number of wire wraps around the hoist drum is greater than or equal to the threshold. The controller sets the at least one operating parameter of the motor to a second operational value if the total number of wire wraps around the hoist drum is less than the threshold. The second operational value is lower than the first operational value.

In another embodiment, the invention provides an industrial machine that includes a hoist drum, a dipper, a wire rope connected between the hoist drum and the dipper, a motor having at least one operating parameter, a sensor, and a controller. The wire rope has a length of wire rope extending from the hoist drum. The sensor generates a signal related to the length of the wire rope extending from the hoist drum, which is received by the controller. The controller determines, based on the signal from the sensor, the length of wire rope extending from the hoist drum, and compares the length of wire rope extending from the hoist drum to a threshold. The controller sets the at least one operating parameter of the motor to a first operational value if the length of wire rope extending from the hoist drum is less than or equal to the threshold. The controller sets the at least one operating parameter of the motor to a second operational value if the length of the wire rope extending from the hoist drum is greater than the threshold. The second operational value is lower than the first operational value.

In another embodiment, the invention provides a method of controlling a motor of an industrial machine. The industrial machine includes a processor, a wire rope, and a hoist drum. The method includes receiving a signal related to a length of a wire rope, determining a number of wire wraps around the hoist drum based on the length of the wire rope, and comparing the number of wire wraps around the hoist drum to a threshold. The method also includes setting at least one operating parameter of the motor to a first operational value if the number of wire wraps around the hoist drum is greater than or equal to the threshold. The method also includes setting the at least one operating parameter of the motor to a second operational value if the number of wire wraps around the hoist drum is less than the threshold. The second operational value is lower than the first operational value.

In another embodiment, the invention provides a method of controlling a motor of an industrial machine. The method includes determining, using a processor, a location of a dipper within a digging cycle, determining, using the processor, whether the location of the dipper is inside a predetermined region of the digging cycle, and setting, using the processor, at least one operating parameter of the motor to a first operational value if the location of the dipper is inside the predetermined region of the digging cycle. The method also includes setting, using the processor, the at least one operating parameter of the motor to a second operational value if the location of the dipper is outside the predetermined region of the digging cycle. The second operational value is greater than the first operational value.

In another embodiment, the invention provides an industrial machine that includes a dipper, a hoist drum, a wire rope connected between the hoist drum and the dipper, an actuation device having at least one operating parameter, and a controller. The controller is configured to monitor a parameter of the industrial machine related to a number of dead wraps around the hoist drum, and modify the at least one operating parameter of the actuation device based on the parameter of the industrial machine related to the number of dead wraps around the drum.

Before any embodiments of the invention are explained in detail, it is to be understood that the invention is not limited in its application to the details of the configuration and arrangement of components set forth in the following description or illustrated in the accompanying drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components may be utilized to implement the invention. For example, "servers" and "computing devices" described in the specification can include one or more processing units, one or more computer-readable medium modules, one or more input/output interfaces, and various connections (e.g., a system bus) connecting the components.

Other aspects of the invention will become apparent by consideration of the detailed description and accompanying drawings.

DETAILED DESCRIPTION

The invention described herein relates to systems, methods, devices, and computer readable media associated with the dynamic control of an industrial machine (e.g., one or more control settings or parameters of the industrial machine). The industrial machine, such as an electric rope shovel or similar mining machine, is operable to execute a digging operation to remove a payload (e.g., material, etc.) from a bank. During the execution of a digging operation, the forces exerted on the wire ropes of the industrial machine vary with, for example, a weight of a load in the dipper, an amount of hoist force, an amount of crowd force, etc. Under certain conditions, it is possible to apply a force to the wire ropes that exceeds a load capability of the wire ropes and beckets that connect the wire ropes to a hoist drum. In order to prevent such a condition, a control system of the industrial machine is configured to dynamically control an amount of hoist force (e.g., hoist motor torque, hoist motor speed, etc.) that is applied to the wire rope. Such control is achieved by regulating the amount of force or power that can be applied to the wire rope based on a number of wire wraps (i.e., dead wraps and active wraps) of the wire rope around a hoist drum. The industrial machine is only allowed to apply a maximum available force to the wire rope when there are a sufficient number of wire wraps around the hoist drum to account for that force (i.e., at least a minimum number of dead wraps). If there are an insufficient number of wire wraps, the motor torque, speed, parameter ramp rate, etc., can be limited to a value that corresponds to the number of wire rope dead wraps.

A sufficient number of wire wraps (i.e., dead wraps) around the hoist drum corresponds to the number of dead wraps that are needed to balance or exceed a force that is applied to the wire rope. For example, a given force is taken up by each dead wrap of the wire rope around the hoist drum. The sum of the forces that can be taken up by dead wraps must match or exceed the force that is applied to the wire rope. Alternatively, the forces that can be taken up by the becket and the dead wraps must match or exceed the force that is applied to the wire rope. The forces that each dead wrap or becket is able to take up is dependent upon, among other things, the size of the hoist drum, the length of the wire rope, the gauge of the wire rope, friction between the hoist drum and the wire rope, the size of the beckets, etc. If a force is applied to the wire rope and becket that is greater than the force that the wire rope and becket can take up (i.e., insufficient dead wraps), the wire rope and becket may become detached or break off from the hoist drum.

Figure 1:
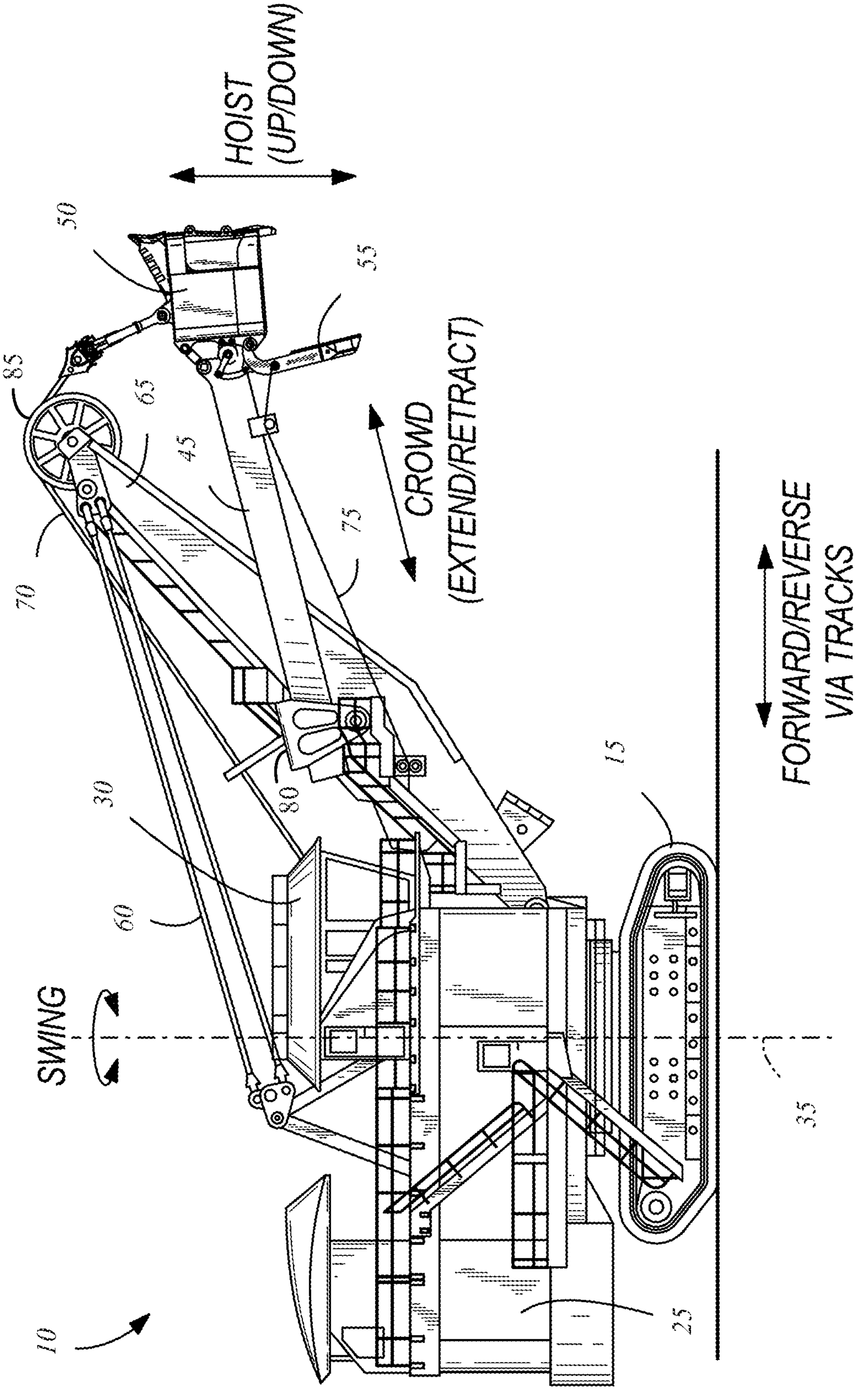
FIG. 1 illustrates an industrial machine according to an embodiment of the invention.

Although the invention described herein can be applied to, performed by, or used in conjunction with a variety of industrial machines (e.g., a rope shovel, a dragline, AC machines, DC machines, etc.), embodiments of the invention described herein are described with respect to an electric rope or power shovel, such as the power shovel 10 shown in FIG. 1. The power shovel 10 includes tracks 15 for propelling the shovel 10 forward and backward, and for turning the rope shovel 10 (i.e., by varying the speed and/or direction of left and right tracks relative to each other). The tracks 15 support a base 25 including a cab 30. The base 25 is able to swing or swivel about a swing axis 35, for instance, to move from a digging location to a dumping location. Movement of the tracks 15 is not necessary for the swing motion. The rope shovel 10 further includes a pivotable dipper handle 45 and dipper 50. The dipper 50 includes a door 55 for dumping contents of the dipper 50.

The rope shovel 10 includes suspension cables 60 coupled between the base 25 and a boom 65 for supporting the boom 65. The rope shovel also include a wire rope or hoist cable 70 attached to a winch and hoist drum (see FIG. 4) within the base 25 for winding the hoist cable 70 to raise and lower the dipper 50, and a dipper trip cable 75 connected between another winch (not shown) and the dipper door 55. The rope shovel 10 also includes a saddle block 80 and a sheave 85. In some embodiments, the rope shovel 10 is a P&H® 4100 series shovel produced by Joy Global Surface Mining.

Figure 2:
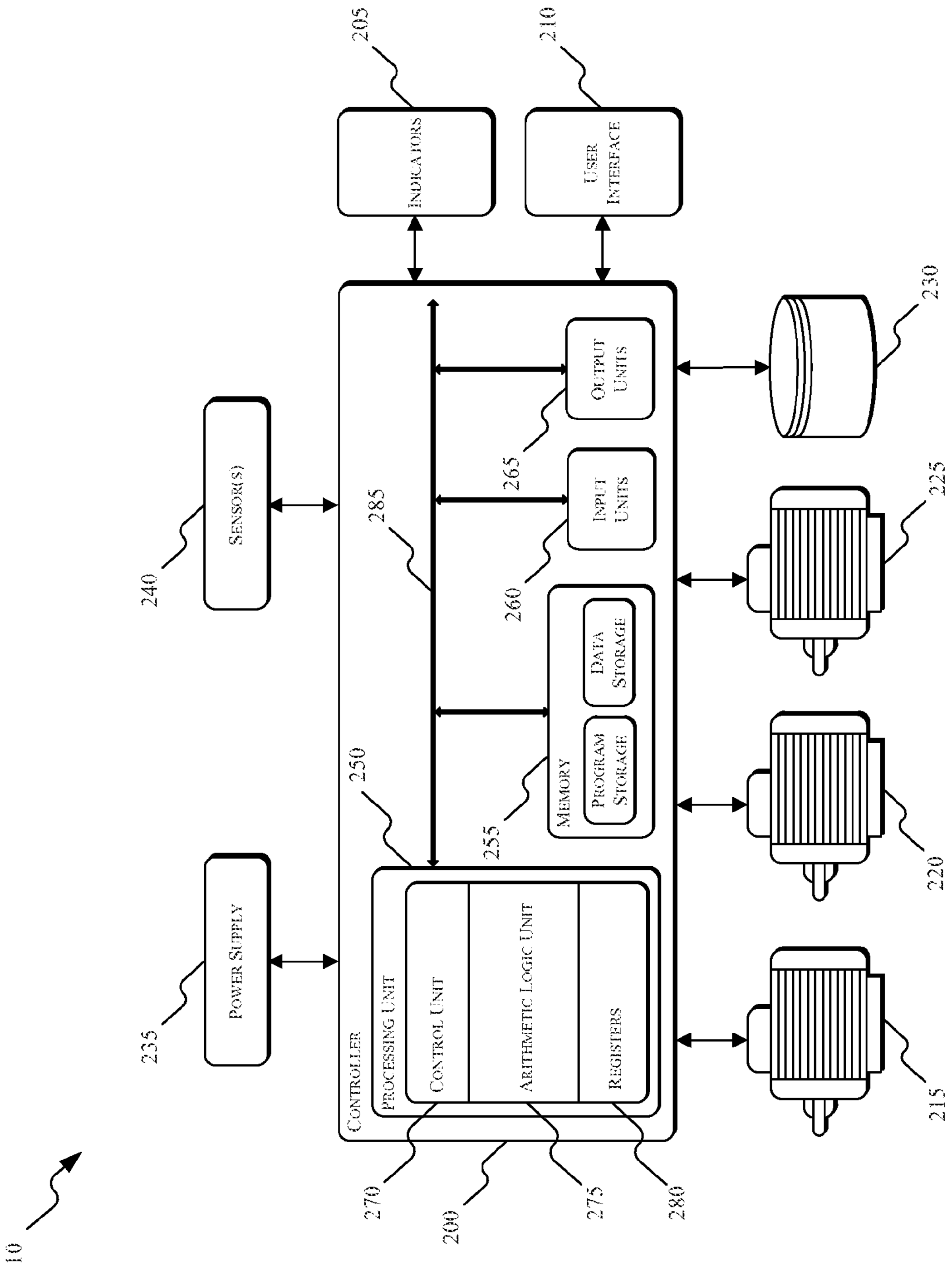
FIG. 2 illustrates a control system of the industrial machine of FIG. 1 according to an embodiment of the invention.

FIG. 2 illustrates a controller 200 associated with the shovel 10 of FIG. 1. The controller 200 is electrically and/or communicatively connected to a variety of modules or components of the shovel 10. For example, the illustrated controller 200 is connected to one or more indicators 205, a user interface module 210, one or more hoist actuation devices (e.g., motors, etc.) and hoist drives 215, one or more crowd actuation devices (e.g., motors, etc.) and crowd drives 220, one or more swing actuation devices (e.g., motors, etc.) and swing drives 225, a data store or database 230, a power supply module 235, and one or more sensors 240. The controller 200 includes combinations of hardware and software that are operable to, among other things, control the operation of the power shovel 10, control the position of the boom 65, the dipper handle 45, the dipper 50, etc., activate the one or more indicators 205 (e.g., a liquid crystal display ["LCD"]), monitor the operation of the shovel 10, etc. The one or more sensors 240 include, among other things, a loadpin strain gauge, one or more inclinometers, gantry pins, one or more motor field modules, one or more resolvers, etc. In some embodiments, a crowd drive other than a crowd motor drive can be used (e.g., a crowd drive for a single legged handle, a stick, a hydraulic cylinder, etc.).

In some embodiments, the controller 200 includes a plurality of electrical and electronic components that provide power, operational control, and protection to the components and modules within the controller 200 and/or shovel 10. For example, the controller 200 includes, among other things, a processing unit 250 (e.g., a microprocessor, a microcontroller, or another suitable programmable device), a memory 255, input units 260, and output units 265. The processing unit 250 includes, among other things, a control unit 270, an arithmetic logic unit ("ALU") 275, and a plurality of registers 280 (shown as a group of registers in FIG. 2), and is implemented using a known computer architecture, such as a modified Harvard architecture, a von Neumann architecture, etc. The processing unit 250, the memory 255, the input units 260, and the output units 265, as well as the various modules connected to the controller 200 are connected by one or more control and/or data buses (e.g., common bus 285). The control and/or data buses are shown generally in FIG. 2 for illustrative purposes. The use of one or more control and/or data buses for the interconnection between and communication among the various modules and components would be known to a person skilled in the art in view of the invention described herein. In some embodiments, the controller 200 is implemented partially or entirely on a semiconductor (e.g., a field-programmable gate array ["FPGA"] semiconductor) chip, such as a chip developed through a register transfer level ("RTL") design process.

The memory 255 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 250 is connected to the memory 255 and executes software instructions that are capable of being stored in a RAM of the memory 255 (e.g., during execution), a ROM of the memory 255 (e.g., on a generally permanent basis), or another non-transitory computer readable medium such as another memory or a disc. Software included in the implementation of the shovel 10 can be stored in the memory 255 of the controller 200. The software includes, for example, firmware, one or more applications, program data, filters, rules, one or more program modules, and other executable instructions. The controller 200 is configured to retrieve from memory and execute, among other things, instructions related to the control processes and methods described herein. In other constructions, the controller 200 includes additional, fewer, or different components.

The power supply module 235 supplies a nominal AC or DC voltage to the controller 200 or other components or modules of the shovel 10. The power supply module 235 is powered by, for example, a power source having nominal line voltages between 100V and 240V AC and frequencies of approximately 50-60 Hz. The power supply module 235 is also configured to supply lower voltages to operate circuits and components within the controller 200 or shovel 10. In other constructions, the controller 200 or other components and modules within the shovel 10 are powered by one or more batteries or battery packs, or another grid-independent power source (e.g., a generator, a solar panel, etc.).

The user interface module 210 is used to control or monitor the power shovel 10. For example, the user interface module 210 is operably coupled to the controller 200 to control the position of the dipper 50, the position of the boom 65, the position of the dipper handle 45, etc. The user interface module 210 includes a combination of digital and analog input or output devices required to achieve a desired level of control and monitoring for the shovel 10. For example, the user interface module 210 includes a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. The user interface module 210 can also be configured to display conditions or data associated with the power shovel 10 in real-time or substantially real-time. For example, the user interface module 210 is configured to display measured electrical characteristics of the power shovel 10, the status of the power shovel 10, the position of the dipper 50, the position of the dipper handle 45, etc. In some implementations, the user interface module 210 is controlled in conjunction with the one or more indicators 205 (e.g., LEDs, speakers, etc.) to provide visual or auditory indications of the status or conditions of the power shovel 10.

Figure 3:
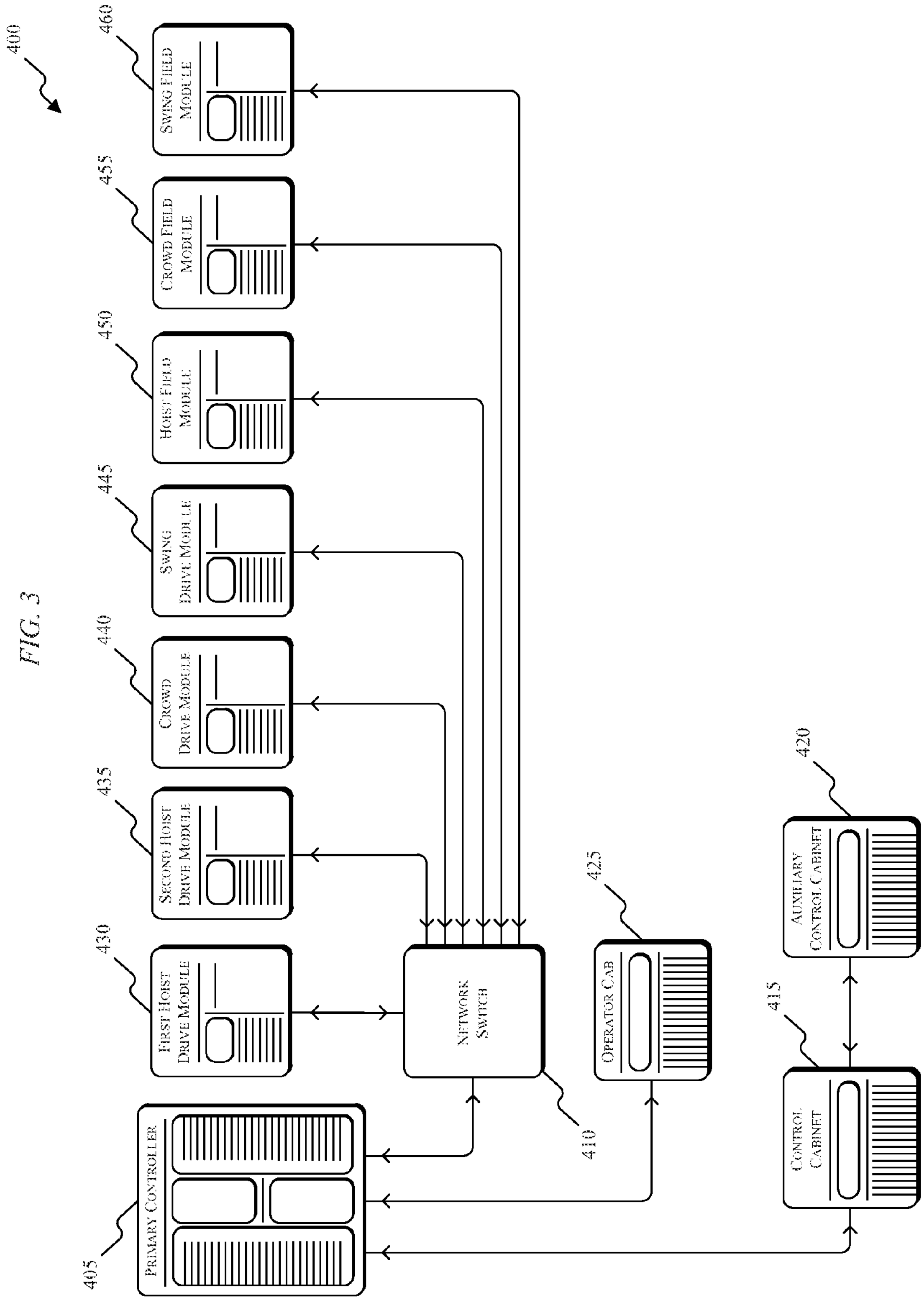
FIG. 3 illustrates a control system of the industrial machine of FIG. 1 according to another embodiment of the invention.

FIG. 3 illustrates a more detailed control system 400 (e.g., applied in a DC machine) for the power shovel 10. For example, the power shovel 10 includes a primary controller 405, a network switch 410, a control cabinet 415, an auxiliary control cabinet 420, an operator cab 425, a first hoist drive module 430, a second hoist drive module 435, a crowd drive module 440, a swing drive module 445, a hoist field module 450, a crowd field module 455, and a swing field module 460. The various components of the control system 400 are connected by and communicate through, for example, a fiber-optic communication system utilizing one or more network protocols for industrial automation, such as process field bus ("PROFIBUS"), Ethernet, ControlNet, Foundation Fieldbus, INTERBUS, controller-area network ("CAN") bus, etc. The control system 400 can include the components and modules described above with respect to FIG. 2. For example, the one or more hoist motors and/or drives 215 correspond to first and second hoist drive modules 430 and 435, the one or more crowd motors and/or drives 220 correspond to the crowd drive module 440, and the one or more swing motors and/or drives 225 correspond to the swing drive module 445. The user interface 210 and the indicators 205 can be included in the operator cab 425, etc. A strain gauge, an inclinometer, gantry pins, resolvers, etc., can provide electrical signals to the primary controller 405, the controller cabinet 415, the auxiliary cabinet 420, etc.

The first hoist drive module 430, the second hoist drive module 435, the crowd drive module 440, and the swing drive module 445 are configured to receive control signals from, for example, the primary controller 405 to control hoisting, crowding, and swinging operations of the shovel 10. The control signals are associated with drive signals for hoist, crowd, and swing motors 215, 220, and 225 of the shovel 10. As the drive signals are applied to the motors 215, 220, and 225, the outputs (e.g., electrical and mechanical outputs) of the motors are monitored and fed back to the primary controller 405 (e.g., via the field modules 450-460). The outputs of the motors include, for example, motor speed, motor torque, motor power, motor current, etc. Based on these and other signals associated with the shovel 10, the primary controller 405 is configured to determine or calculate one or more operational states or positions of the shovel 10 or its components. In some embodiments, the primary controller 405 determines a dipper position, a dipper handle angle or position, a hoist rope wrap angle, a hoist motor rotations per minute ("RPM"), a number of wire wraps around the hoist drum 500, a crowd motor RPM, a dipper speed, a dipper acceleration, etc.

Figure 4:
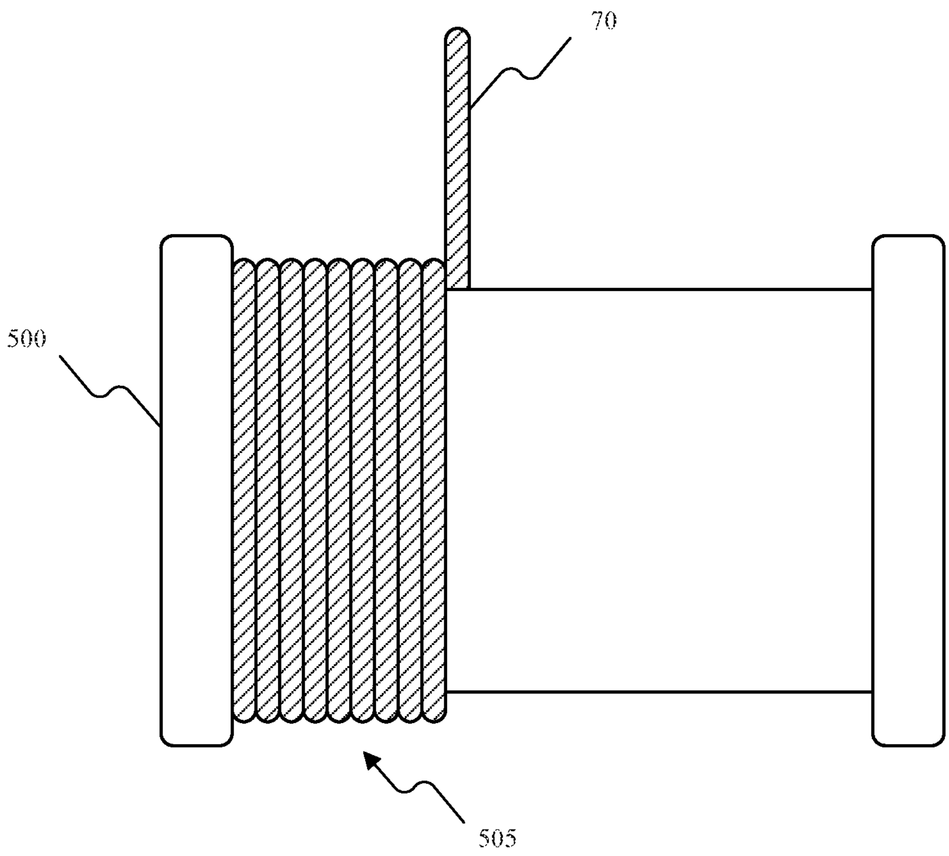
FIG. 4 illustrates a hoist drum including a plurality of wire wraps.

The controller 200 and/or the control system 400 of the shovel 10 described above are used to control the operation of the industrial machine 10 based on, for example, a number of wire wraps around a hoist drum. FIG. 4 illustrates a drum 500, such as a hoist drum, for wrapping a wire rope (e.g., wire rope 70). The drum 500 includes a number of wire wraps 505 (i.e., including dead wraps and active wraps). The controller 200 or the control system 400 of the industrial machine 10 are configured to determine, for example, the number of wire wraps of the wire rope around the drum 500 and, based on the determined number of wire wraps, control the forces that can be applied to the wire rope.

Figure 5:
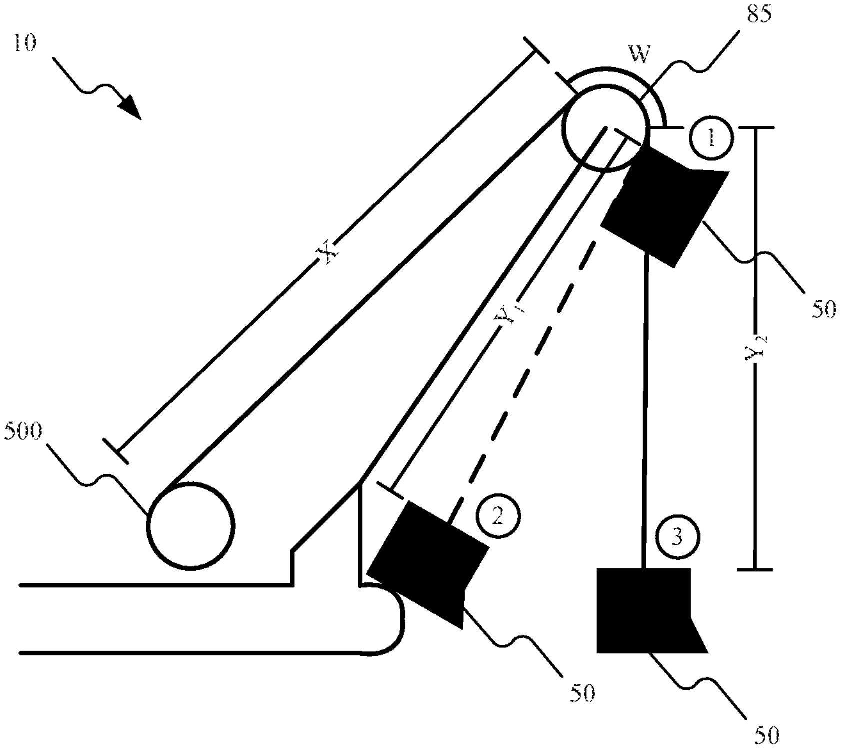
FIG. 5 illustrates a technique for determining hoist rope wire wraps according to an embodiment of the invention.
Figure 6:
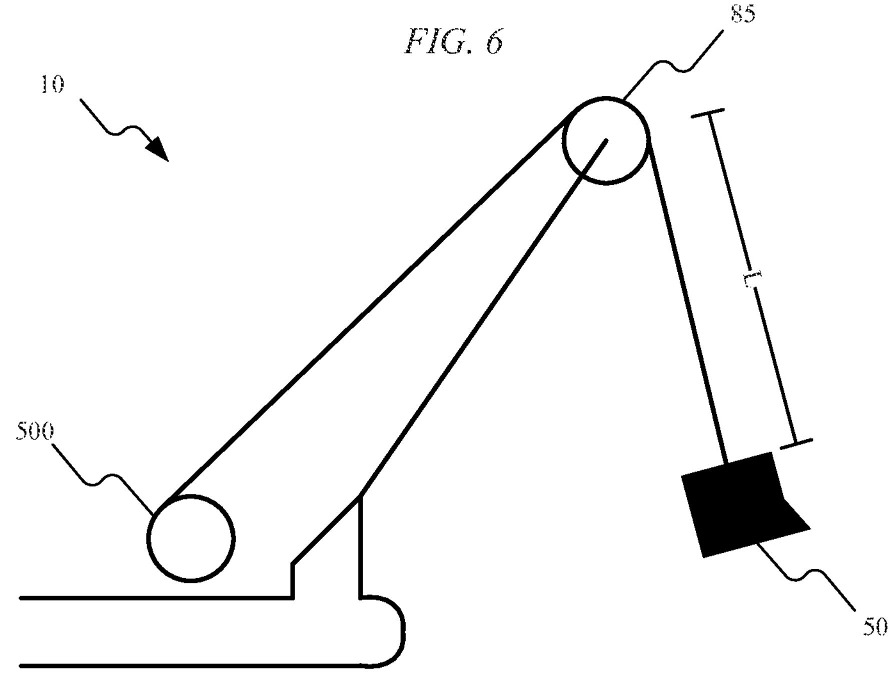
FIG. 6 illustrates a technique for determining wire rope length according to another embodiment of the invention.
Figure 7:
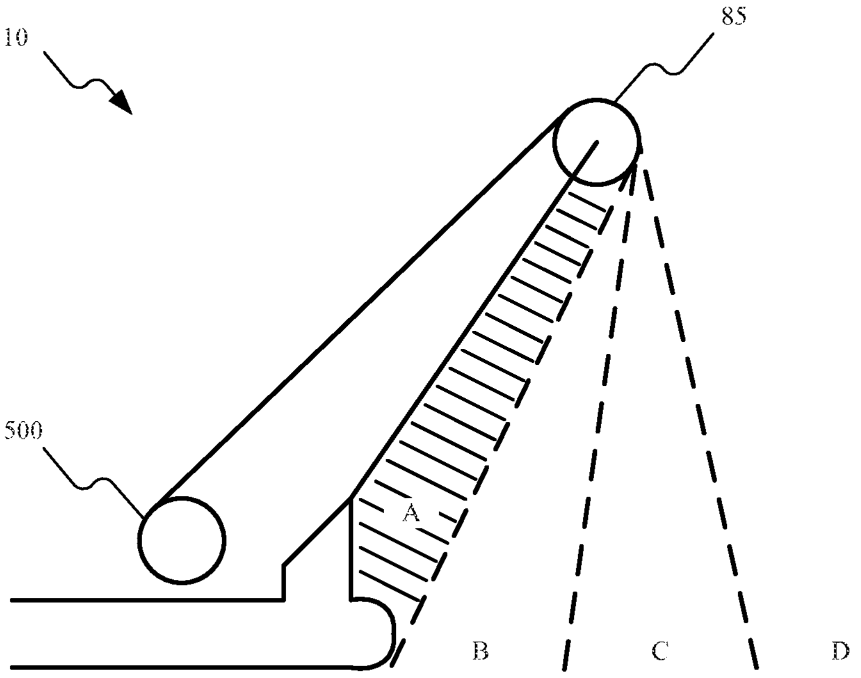
FIG. 7 illustrates a technique for determining dipper position according to another embodiment of the invention.

Implementations of a wire wrap or dead wrap control feature for the shovel 10 are illustrated with respect to FIGS. 5-7. FIG. 5 illustrates relationships between the dipper 50 position and wire rope lengths for determining the number of wire wraps around the hoist drum 500. FIG. 5 illustrates the dipper 50 at a first location (1), a second location (2), and a third location (3). Although only three locations are illustrated in FIG. 5 for exemplary purposes, any number of additional locations can be used for determining the number of wire wraps. In some embodiments, the number of wire wraps is determined continuously regardless of the location of the dipper 50.

For each location of the dipper 50, the length, X, of the wire rope between the hoist drum 500 and the sheave 85 is fixed. Similarly, the length, W, around the sheave 85 is substantially fixed. Variations in the length, W, are negligible with respect to the amount wire rope around the hoist drum for a single wire wrap. The length, W, is shown in FIG. 5 without variation for illustrative purposes. The operational length of the wire rope 70 then varies based on the position of the dipper 50. At position (1), the operational length of the wire rope is zero (i.e., the extended length of the wire rope corresponds to only the sum of the fixed lengths X and W). At position (2), the operational length of the wire rope is $Y_1$, and the extended length of the wire rope is equal to the sum of lengths X, W, and $Y_1$. At position (3), the operational length of the wire rope is $Y_2$, and the extended length of the wire rope is equal to the sum of lengths X, W, and $Y_2$. The controller 200 is configured to determine, for example, a hoist resolver count for each of locations (1), (2), and (3). With the resolver count at location (1) corresponding to a starting point, a change in the resolver counts between location (1) and locations (2) or (3) can be used to determine a change in the length of the wire rope from the starting location (1). The change in the length of the wire rope can then be used to determine the number of wire wraps around the hoist drum 500. Specifically, the number of revolutions of the wire rope around the hoist drum can be determined as set forth below in Equation 1:

$$R = M - \frac{\Delta Y}{L} \tag{1}$$

wherein R is the number of wire wraps or revolutions of the wire rope around the hoist drum, L is the length of a single revolution of the wire rope around the hoist drum, ΔY is the change in the length of the wire rope from location (1) to location (2) or location (3), and M is the hoist drum capacity or maximum number of wire wraps around the hoist drum. The maximum number of wire wraps, M, can be calculated as the total length of the wire rope minus the lengths, W, and, X, described above and divided by the length, L, of a single revolution of the wire rope around the hoist drum. The change in the length of the wire rope, ΔY, accounts for the substantially fixed lengths of X and W described above, which cancel when the change in the length of the wire rope is determined. The maximum number of wire wraps around the hoist drum is dependent upon the industrial machine 10 (e.g., boom length, hoist drum size, etc.). For example, using a standardized wire rope length can result in a fewer number of maximum wire wraps around the hoist drum when the wire rope is used with a larger machine (e.g., with a longer boom). Conversely, a greater number of maximum wire wraps can be present when the same length wire rope is used with a smaller machine (e.g., with a shorter boom). As the dipper moves from location (1), the number of wire wraps around the hoist drum decreases. The maximum number of wire wraps around the hoist drum, M, and the length of a single revolution of the wire rope around the hoist drum, L, can be predetermined and programmed into the controller 200 for the purpose of calculating the number of revolutions of the wire rope around the hoist drum, R. After the number of wire wraps or revolutions of the wire rope around the hoist drum has been determined, the number of wire wraps is used to set a value for an operational parameter of the industrial machine 10, as set forth below. In some embodiments, dipper location, the total length of the wire rope, or the change in the length of the wire rope from location (1) to, for example, location (2) or location (3) is used to set a value for an operational parameter of the industrial machine 10.

FIG. 6 illustrates an alternative technique for determining whether a sufficient number of dead wraps are present on the hoist drum 500. In FIG. 6, a shovel kinematic model that is determined by the controller 200 is used to determine if there are a sufficient number of dead wraps around the hoist drum 500 by determining a real-time boom point sheave position and dipper position. The kinematic model of the industrial machine receives, for example, signals and information from resolvers related to the positions or characteristics of various components of the industrial machine. The resolvers are, for example, rotary displacement resolvers mounted to various gears within the industrial machine 10. The resolvers provide electrical signals to the controller 200 which conditions, processes, etc., the electrical signals from the one or more resolvers. The kinematic model is then used to determine or calculate, for example, a shovel 10 characteristic such as the position of the dipper, hoist wrap angle about the sheave 85, etc., based on the output of the resolvers and hoist, crowd, and swing signals associated with the hoist motors 215, the crowd motors 220, and the swing motors 225. Using the kinematic model, the controller 200 determines a length, L, of the wire rope between the sheave 85 and the dipper 50. If the length of the wire rope, L, is greater than or equal to a predetermined value (e.g., which corresponds to a predetermined minimum number of dead wraps), the length, L, is used to set a value for an operational parameter of the industrial machine 10, as set forth below.

FIG. 7 illustrates an alternative technique for determining whether a sufficient number of dead wraps are present on the hoist drum. In FIG. 7, the location of the dipper 50 is used to determine whether a sufficient number of dead wraps are present on the hoist drum. The location of the dipper 50 can be divided into any number of different regions corresponding to different portions of a digging cycle. In FIG. 7, the digging cycle is divided into four regions: A, B, C, and D. In region A, which corresponds to a maximum wire rope length, there are an insufficient number of dead wraps around the hoist drum and the location of the dipper 50 in region A is used to set a value for an operational parameter of the industrial machine 10. If the dipper is located in region B, C, or D, there are a sufficient number of dead wraps and the operational parameter of the industrial machine 10 is not controlled based on the number of dead wraps. As described above, the number of maximum wire wraps around the hoist drum can vary when using a standardized wire rope length with different size machines. For example, there are a fewer number of maximum wire wraps when the standardized rope length is used on a larger machine (e.g., with a longer boom). A larger machine can also pay out more wire rope. As such, the larger machine may have an insufficient number of dead wraps around the hoist drum more frequently during the digging cycle than the smaller machine, and portions of the digging cycle (e.g., region A) corresponding to an insufficient number of dead wraps may be larger for a larger machine. In some embodiments, the location of the dipper can be determined, for example, using the kinematic model described above with respect to FIG. 6. In other embodiments, the controller 200 determines, for example, a hoist wire rope angle off of the sheave 85 (e.g., based on a resolver count). The hoist wire rope angle can then be compared to angles that correspond to the different regions (e.g., Regions A, B, C, and D) of the digging cycle.

The processes 600, 700, and 800 are associated with and described herein with respect to a digging operation and forces (e.g., hoist forces, etc.) applied during the digging operation. Various steps described herein with respect to the processes 600, 700, and 800 are capable of being executed simultaneously, in parallel, or in an order that differs from the illustrated serial manner of execution. The processes 600, 700, and 800 are also each capable of being executed using fewer steps than are shown in the illustrated embodiment. For example, one or more functions, formulas, or algorithms can be used to calculate a desired motor speed or motor torque based on the number of wire wraps around the hoist drum 500.

Figure 8:
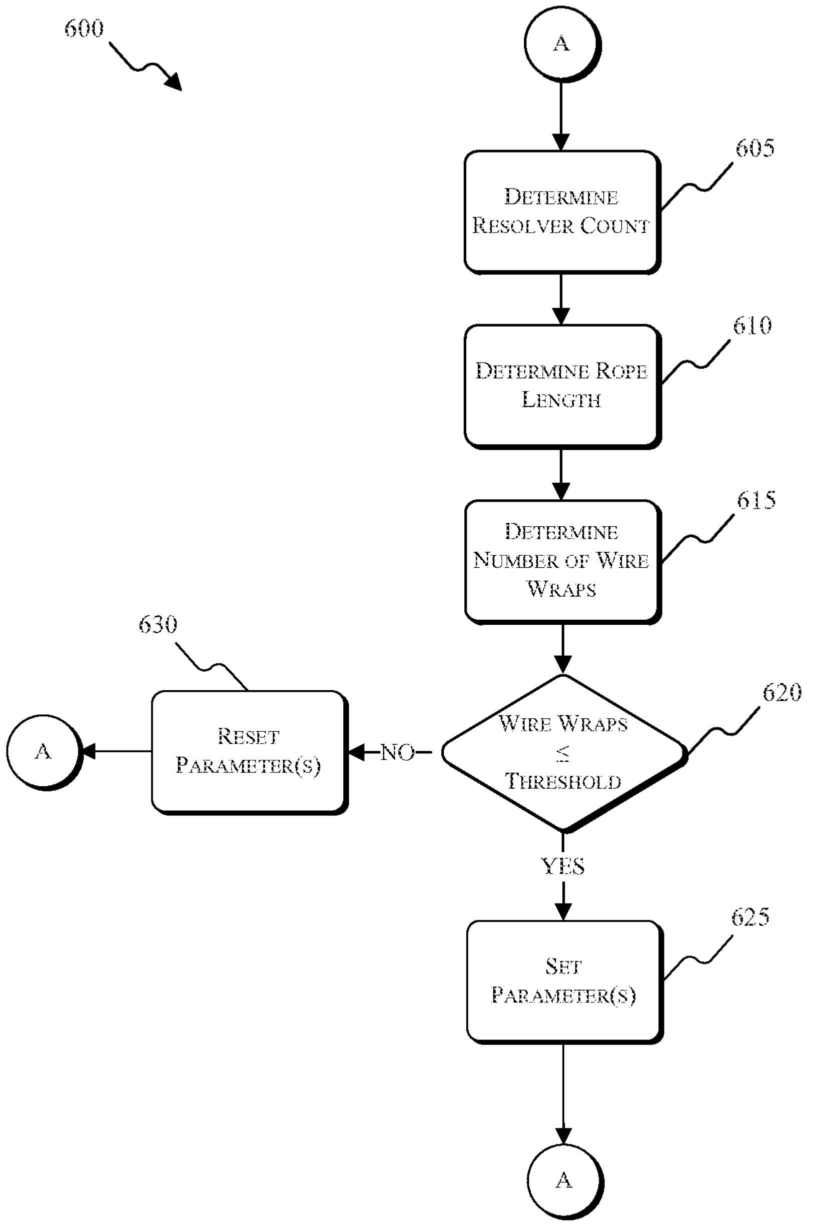
FIG. 8 is a process for controlling a parameter of an industrial machine according to an embodiment of the invention.

As illustrated in FIG. 8, the process 600 begins at step 605 with a hoist resolver count being determined. As described above, the resolver may be a rotary displacement resolver that provides an indication of how much wire rope has been extended beyond the fixed lengths of wire rope during a digging operation. Based on the resolver count, a length of the wire rope is determined (step 610). The wire rope length can be a total wire rope length extending from the hoist drum 500 to the dipper 50, or the wire rope length from the sheave 85 to the dipper 50. At step 615, the rope length is used to determine the number of wire wraps of the wire rope 70 around the hoist drum 500, as described above. If, at step 620, the number of wire wraps is less than or equal to a threshold value (i.e., the minimum number of wire rope dead wraps), a parameter or parameters of the industrial machine is/are set (step 625). The parameter(s) of the industrial machine can be set, for example, as a function (e.g., a linear function, a non-linear function, a polynomial function, etc.) of the number of wire wraps, can be proportional to the number of wire wraps (e.g., directly proportional), etc. If, at step 620, the number of wire wraps is greater than the threshold value, the parameter(s) of the industrial machine is/are set or maintained at normal operational values (step 630). After the parameter(s) is/are set at step 625, the process 600 returns to step 605 where the resolver count is again determined, the wire rope length is determined (step 610), the number of wire wraps are determined (step 615), and the number of wire wraps is compared to the threshold value (step 620). If, after the parameter(s) is/are set at step 625, the number of wire wraps is greater than the threshold value, the parameter(s) is/are reset to normal operational values (step 630).

The parameters of the industrial machine can include, for example, motor torque, motor speed, motor ramp rate, combinations thereof, etc. One or more of these parameters can be set to a value lower than a normal operational value. As illustrative examples, a motor speed can be set to a revolutions per minute ("RPM") value that is lower than a normal operational speed during a given portion of the digging cycle, a motor torque can be set to a value that is a percentage of a normal operational torque during a given portion of the digging cycle (e.g., <100% of normal operational torque), or a ramp rate can be set to a value such that a transition from a present load on the wire rope is gradually increased over a desired interval of time (e.g., in seconds). Additionally or alternatively, a speed limit and a torque limit can be set together, a torque limit and a ramp rate can be set together, a speed limit and a ramp rate can be set together, or a speed limit, a torque limit, and a ramp rate can all be set together. In some embodiments, the limited parameters can be prorated or proportioned based on the total length of the wire rope 70. Additionally, the limited parameters can correspond to predetermined values (e.g., set values for torque, speed, ramp rate, etc.), or the limited values for these parameters can be dynamically or continuously calculated in relation to or as a function the number of wire wraps around the hoist drum 500.

Figure 9:
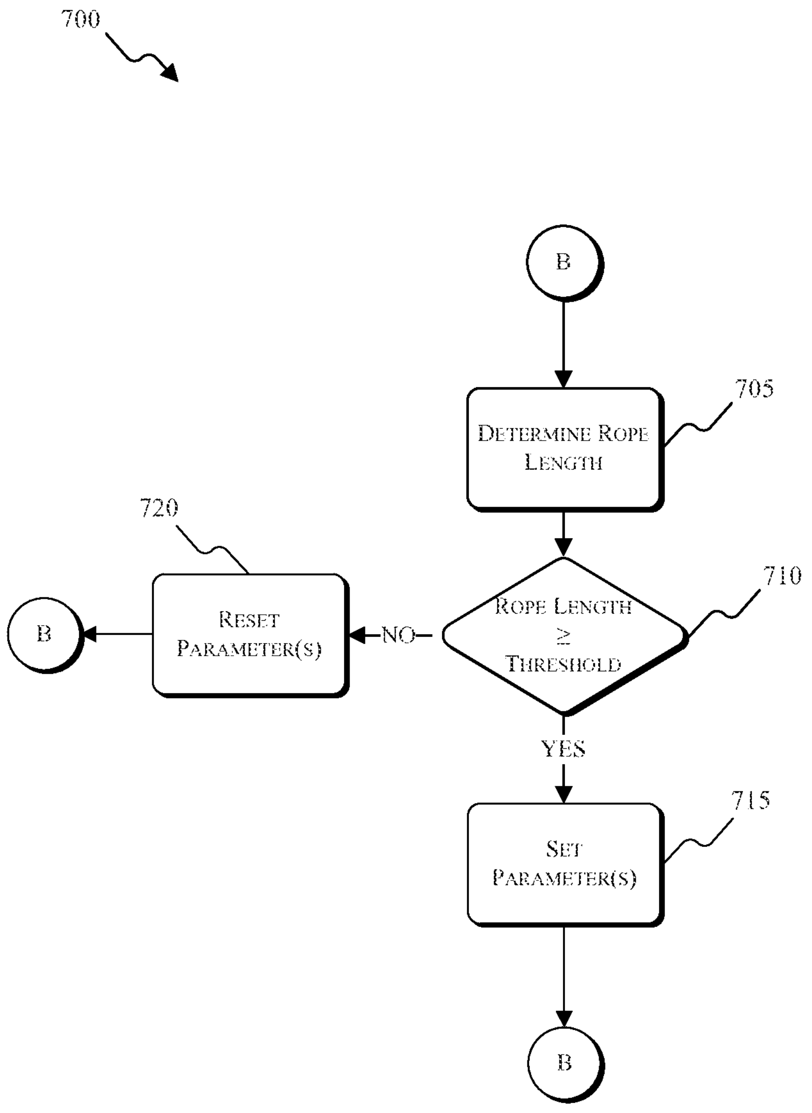
FIG. 9 is a process for controlling a parameter of an industrial machine according to another embodiment of the invention.

As illustrated in FIG. 9, the process 700 begins at step 705 with, for example, the controller 200 determining a length of the wire rope. As described above with respect to FIG. 6, the controller 200 can determine the length of the wire rope, L, using a kinematic model of the industrial machine 10. The wire rope length can be a total wire rope length extending from the hoist drum 500 to the dipper 50, or the wire rope length from the sheave 85 to the dipper 50. At step 710, if the rope length is greater than or equal to a threshold length value (i.e., insufficient dead wraps), a parameter or parameters of the industrial machine is/are set (step 715). The parameter(s) of the industrial machine can be set, for example, as a function (e.g., a linear function, a non-linear function, a polynomial function, etc.) of the length of the wire rope, can be proportional to the length of the wire rope (e.g., directly proportional), etc. If, at step 710, the rope length is less than the threshold length value (i.e., sufficient dead wraps), the parameter(s) of the industrial machine is/are set or maintained at normal operational values (step 720). After the parameter(s) is/are set at step 715, the process 500 returns to step 705 where the wire rope length is determined, and the wire rope length is compared to the threshold value (step 710). If, after the parameter(s) is/are set at step 715, the wire rope length is no longer greater than or equal to the threshold value, the parameter(s) is/are reset to normal operational values (step 720).

As described above with respect to process 600, the parameters of the industrial machine can include, for example, motor torque, motor speed, motor ramp rate, combinations thereof, etc. One or more of these parameters can be set to a value lower than a normal operational value. As illustrative examples, a motor speed can be set to an RPM value that is lower than a normal operational speed during a given portion of the digging cycle, a motor torque can be set to a value that is a percentage of a normal operational torque during a given portion of the digging cycle (e.g., <100% of normal operational torque), or a ramp rate can be set to a value such that a transition from a present load on the wire rope is gradually increased over a desired interval of time (e.g., in seconds). Additionally or alternatively, a speed limit and a torque limit can be set together, a torque limit and a ramp rate can be set together, a speed limit and a ramp rate can be set together, or a speed limit, a torque limit, and a ramp rate can all be set together. Additionally, the limited parameters can correspond to predetermined values (e.g., set values for torque, speed, ramp rate, etc.), or the limited values for these parameters can be dynamically or continuously calculated in relation to or as a function the length of the wire rope.

Figure 10:
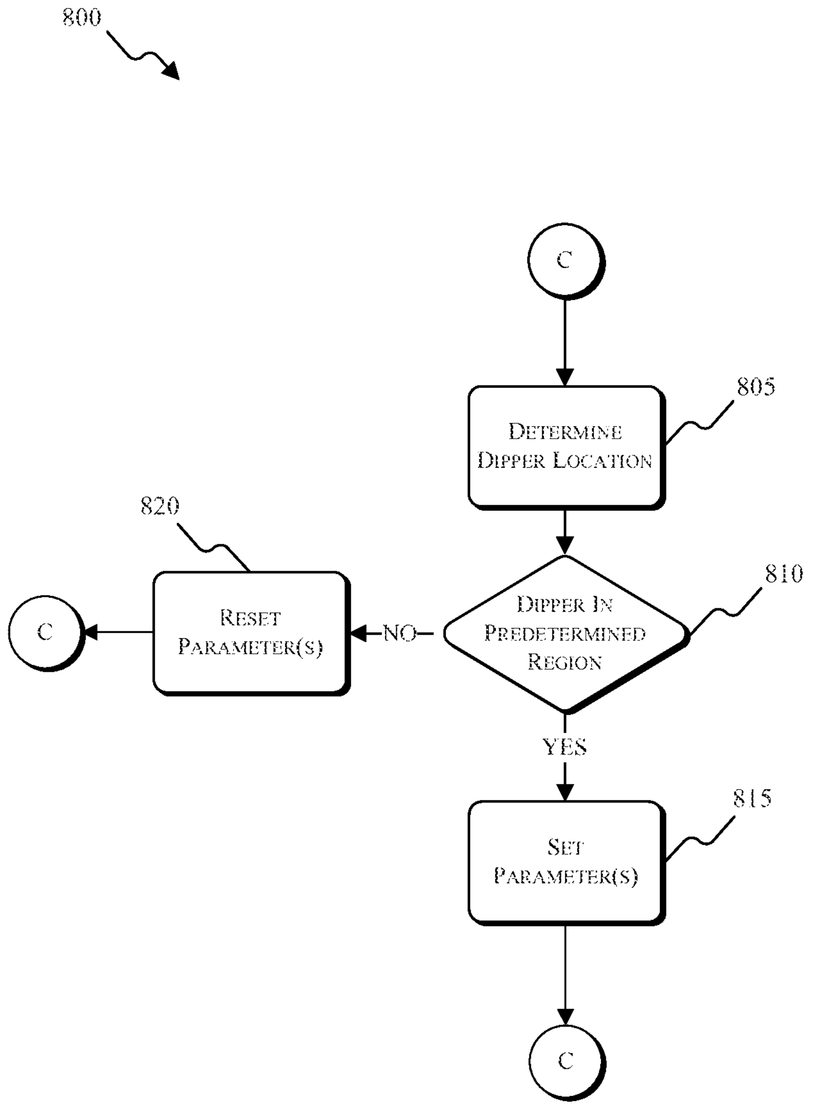
FIG. 10 is a process for controlling a parameter of an industrial machine according to another embodiment of the invention.

As illustrated in FIG. 10, the process 800 begins at step 805 with, for example, the controller 200 determining a location of the dipper 50. As described above with respect to FIG. 7, the controller 200 can determine the location of the dipper 50 using, for example, the kinematic model of the industrial machine 10 or the wire rope angle off of sheave 85. At step 810, if the dipper is located in a predetermined region (e.g., region A in FIG. 7), a parameter or parameters of the industrial machine is/are set (step 815). The parameter(s) of the industrial machine can be set, for example, as a function (e.g., a linear function, a non-linear function, a polynomial function, etc.) of the number of the location of the dipper, can be proportional to the location of the dipper (e.g., based on location within a digging cycle), etc. If, at step 810, the dipper is not in the predetermined region, the parameter(s) of the industrial machine is/are set or maintained at normal operational values (step 820). After the parameter(s) is/are set at step 815, the process 500 returns to step 805 where the location of the dipper 50 is again determined, and the location of the dipper 50 is compared to a predetermined region of a digging cycle (step 810). If, after the parameter(s) is/are set at step 815, the dipper 50 is no longer in the predetermined region, the parameter(s) is/are reset to normal operational values (step 820).

As described above with respect to processes 600 and 700, the parameters of the industrial machine can include, for example, motor torque, motor speed, motor ramp rate, combinations thereof, etc. One or more of these parameters can be set to a value lower than a normal operational value. As illustrative examples, a motor speed can be set to a revolutions per minute ("RPM") value that is lower than a normal operational speed during a given portion of the digging cycle, a motor torque can be set to a value that is a percentage of a normal operational torque during a given portion of the digging cycle (e.g., <100% of normal operational torque), or a ramp rate can be set to a value such that a transition from a present load on the wire rope is gradually increased over a desired interval of time (e.g., in seconds). Additionally or alternatively, a speed limit and a torque limit can be set together, a torque limit and a ramp rate can be set together, a speed limit and a ramp rate can be set together, or a speed limit, a torque limit, and a ramp rate can all be set together. Additionally, the limited parameters can correspond to predetermined values (e.g., set values for torque, speed, ramp rate, etc.), or the limited values for these parameters can be dynamically or continuously calculated in relation to or as a function the location of the dipper.

In some embodiments, such wire wrap or dead wrap control is active only early in a digging cycle because once the dipper has proceeded further into the digging cycle there are a sufficient number of dead wraps on the drum for full power to be applied. In other embodiments, the wire wrap or dead wrap control is active throughout a portion of the digging cycle. Also, in addition to limiting the failure of the wire rope and beckets on the machine due to payload, the wire wrap or dead wrap control can also account for the variability in the crimping process used to attach the beckets to the wire rope (e.g., by requiring additional dead wraps). The wire wrap or dead wrap control can also allow for an increased rope travel on a particular hoist drum such that a long range attachment to be used with a standard hoist drum and a standard transmission.

Thus, the invention provides, among other things, systems, methods, devices, and computer readable media for controlling an operational parameter of an industrial machine based on a number or wire wraps around a hoist drum. Various features and advantages of the invention are set forth in the following claims.

What is claimed is:

1. An industrial machine comprising:

a dipper;

a hoist drum;

a wire rope connected between the hoist drum and the dipper, the wire rope having a length;

a motor having at least one operating parameter and configured to apply a force to the wire rope;

a sensor operable to generate a signal related to the length of the wire rope; and a controller configured to receive the signal related to the length of the wire rope, determine a number of wire wraps around the hoist drum based on the signal, compare the number of wire wraps around the hoist drum to a threshold, set the at least one operating parameter of the motor to a first operational value if the number of wire wraps around the hoist drum is greater than or equal to the threshold, and set the at least one operating parameter of the motor to a second operational value if the number of wire wraps around the hoist drum is less than the threshold, the second operational value being lower than the first operational value.

2. The industrial machine of claim 1, wherein the motor is a hoist motor.

3. The industrial machine of claim 1, wherein the at least one operating parameter of the motor is at least one operating parameter selected from the group consisting of a motor speed, a motor torque, and a motor ramp rate.

4. The industrial machine of claim 1, wherein the second operational value is determined as a function of the number of wire wraps around the hoist drum.

5. The industrial machine of claim 1, wherein the sensor is a resolver.

6. The industrial machine of claim 5, wherein the resolver is a rotary displacement resolver associated with the motor.

7. The industrial machine of claim 5, wherein the signal related to the length of the wire rope is a signal related to a resolver count of the resolver.

8. The industrial machine of claim 1, wherein the threshold is a minimum number of dead wraps around the hoist drum for the industrial machine to apply a maximum available force to the wire rope.

9. An industrial machine comprising:

a hoist drum;

a dipper;

a wire rope connected between the hoist drum and the dipper, the wire rope having a length of wire rope extending from the hoist drum;

a motor having at least one operating parameter;

a sensor operable to generate a signal related to the length of wire rope extending from the hoist drum; and a controller configured to receive the signal related to the length of wire rope extending from the hoist drum, determine the length of wire rope extending from the hoist drum, compare the length of wire rope extending from the hoist drum to a threshold, set the at least one operating parameter of the motor to a first operational value if the length of wire rope extending from the hoist drum is less than or equal to the threshold, and set the at least one operating parameter of the motor to a second operational value if the length of wire rope extending from the hoist drum is greater than the threshold, the second operational value being lower than the first operational value.

10. The industrial machine of claim 9, wherein the motor is a hoist motor.

11. The industrial machine of claim 9, wherein the at least one operating parameter of the motor is at least one operating parameter selected from the group consisting of a motor speed, a motor torque, and a motor ramp rate.

12. The industrial machine of claim 9, wherein the second operational value is determined as a function of the length of wire rope extending from the hoist drum.

13. The industrial machine of claim 9, wherein the sensor is a resolver.

14. The industrial machine of claim 13, wherein the resolver is a rotary displacement resolver associated with the motor.

15. The industrial machine of claim 13, wherein the signal related to the length of wire rope extending from the hoist drum is a signal related to a resolver count of the resolver.

16. The industrial machine of claim 9, wherein the threshold is a maximum length of wire rope extending from the hoist drum for the industrial machine to apply a maximum available force to the wire rope.

17. A method of controlling a motor of an industrial machine, the method comprising:

receiving, at a processor, a signal related to a length of a wire rope;

determining, at the processor, a number of wire wraps around a hoist drum based on the signal related to the length of the wire rope;

comparing, at the processor, the number of wire wraps around the hoist drum to a threshold;

setting, using the processor, at least one operating parameter of the motor to a first operational value if the number of wire wraps around the hoist drum is greater than or equal to the threshold; and setting, using the processor, the at least one operating parameter of the motor to a second operational value if the number of wire wraps around the hoist drum is less than the threshold, the second operational value being lower than the first operational value.

18. The method of claim 17, wherein the motor is a hoist motor.

19. The method of claim 17, wherein the at least one operating parameter of the motor is at least one operating parameter selected from the group consisting of a motor speed, a motor torque, and a motor ramp rate.

20. The method of claim 17, wherein the second operational value is determined as a function of the number of wire wraps around the hoist drum.

21. The method of claim 17, further comprising generating, using a resolver, the signal related to the length of the wire rope.

22. The method of claim 21, wherein the resolver is a rotary displacement resolver associated with the motor.

23. The method of claim 21, wherein the signal related to the length of the wire rope is a signal related to a resolver count of the resolver.

24. The method of claim 17, wherein the threshold is a minimum number of dead wraps around the hoist drum for the industrial machine to apply a maximum available force to the wire rope.

* * * * *